(12) United States Patent
Gao

(10) Patent No.: US 10,642,052 B2
(45) Date of Patent: May 5, 2020

(54) ON-BOARD HEAD UP DISPLAY

(71) Applicant: ShenZhen Ouilegoo Network Technology Co., Ltd., Shenzhen (CN)

(72) Inventor: Qingxian Gao, Shenzhen (CN)

( * ) Notice: Subject to any disclaimer, the term of this patent is extended or adjusted under 35 U.S.C. 154(b) by 27 days.

(21) Appl. No.: 15/980,727

(22) Filed: May 15, 2018

(65) Prior Publication Data
US 2019/0285901 A1     Sep. 19, 2019

(30) Foreign Application Priority Data

Mar. 14, 2018  (CN) .......................... 2018 1 0207699

(51) Int. Cl.
*G02B 27/01*       (2006.01)
*B60C 23/04*       (2006.01)

(52) U.S. Cl.
CPC ...... *G02B 27/0179* (2013.01); *B60C 23/0408* (2013.01); *B60C 23/0491* (2013.01); *G02B 27/0101* (2013.01); *G02B 27/0149* (2013.01); *G02B 2027/014* (2013.01); *G02B 2027/0154* (2013.01)

(58) Field of Classification Search
CPC ............ G02B 27/0179; G02B 27/0101; G02B 27/0149; G02B 2027/014; G02B 2027/0154; B60C 23/0408; B60C 23/0491
USPC ....................................................... 345/7–9
See application file for complete search history.

(56) References Cited

U.S. PATENT DOCUMENTS

| | | | | |
|---|---|---|---|---|
| 6,481,851 B1* | 11/2002 | McNelley | .......... | G02B 27/2292 345/5 |
| 2002/0069008 A1* | 6/2002 | Nantz | .................... | B60K 31/00 701/93 |
| 2009/0051531 A1* | 2/2009 | Boss | ........................ | G06F 21/88 340/568.1 |
| 2010/0282798 A1* | 11/2010 | Park | .................... | B60R 11/0235 224/309 |
| 2016/0167514 A1* | 6/2016 | Nishizaki | ............... | G09G 3/025 345/7 |
| 2018/0148072 A1* | 5/2018 | Kamiya | ............... | G06K 9/0061 |
| 2018/0339590 A1* | 11/2018 | Fujie | .................. | G02B 27/0101 |

* cited by examiner

*Primary Examiner* — Amare Mengistu
*Assistant Examiner* — Gloryvid Figueroa-Gibson
(74) *Attorney, Agent, or Firm* — Kilpatrick Townsend & Stockton, LLP

(57) ABSTRACT

An on-board head up display (HUD) includes a housing, a support member rotatably connected to the housing, a display screen being transparent and flat, and a side of the display screen is fixed to the support member, and a control device located in the housing and configured to obtain traveling information from an on-board automatic diagnostic system, and the control device is further connected to the display screen and configured to display the traveling information on the display screen, and the control device is connected to the support member and configured to drive the support member to rotate with respect to the housing.

18 Claims, 5 Drawing Sheets

ON-BOARD HEAD UP DISPLAY

CROSS-REFERENCE TO RELATED APPLICATION

This application claims priority to Chinese Patent Application No. 201810207699.7, entitled "ON-BOARD HEAD UP DISPLAY" filed Mar. 14, 2018, the content of which is expressly incorporated by reference herein in its entirety.

TECHNICAL FIELD

The present disclosure is related to the on-board auxiliary product technical field, and particularly relates to an on-board head up display (HUD).

BACKGROUND

The HUD is a flight auxiliary instrument widely applied on aircrafts, which uses the principle of optical reflection to project the important navigation information, recreation information on the lens in front of the pilot, such that the pilot can be informed of the displayed information of the meters and navigator without lowering head to check, such that the attention of the pilot is prevented from being interrupted by lowing head to check and losing control of the status, thereby improving the safety of the flight.

Currently, an increasing number of HUDs are applied in the vehicle industry. Most conventional an on-board HUDs appear in a rectangular block structure and is placed in front of a driver to display part of the driving information, still, the conventional an on-board HUDs also block a part of the driving view of the driver, which results that the safety of the driving as well as the experience of the user are compromised.

SUMMARY

According to various embodiments, an on-board head up display is provided.

An on-board head up display (HUD) includes a housing; a support member rotatably connected to the housing; a display screen being transparent and flat, and a side of the display screen is fixed to the support member; and a control device located in the housing and configured to obtain traveling information from an on-board automatic diagnostic system, and the control device is further connected to the display screen and configured to display the traveling information on the display screen, and the control device is connected to the support member and configured to drive the support member to rotate with respect to the housing.

The details of at least one embodiment of the present disclosure will be presented with reference to the following drawings and description. Other characteristic, purposes and advantages of the present disclosure will be more apparent from the specification, drawing and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following.

DETAILED DESCRIPTION OF THE EMBODIMENTS

Figure 1:
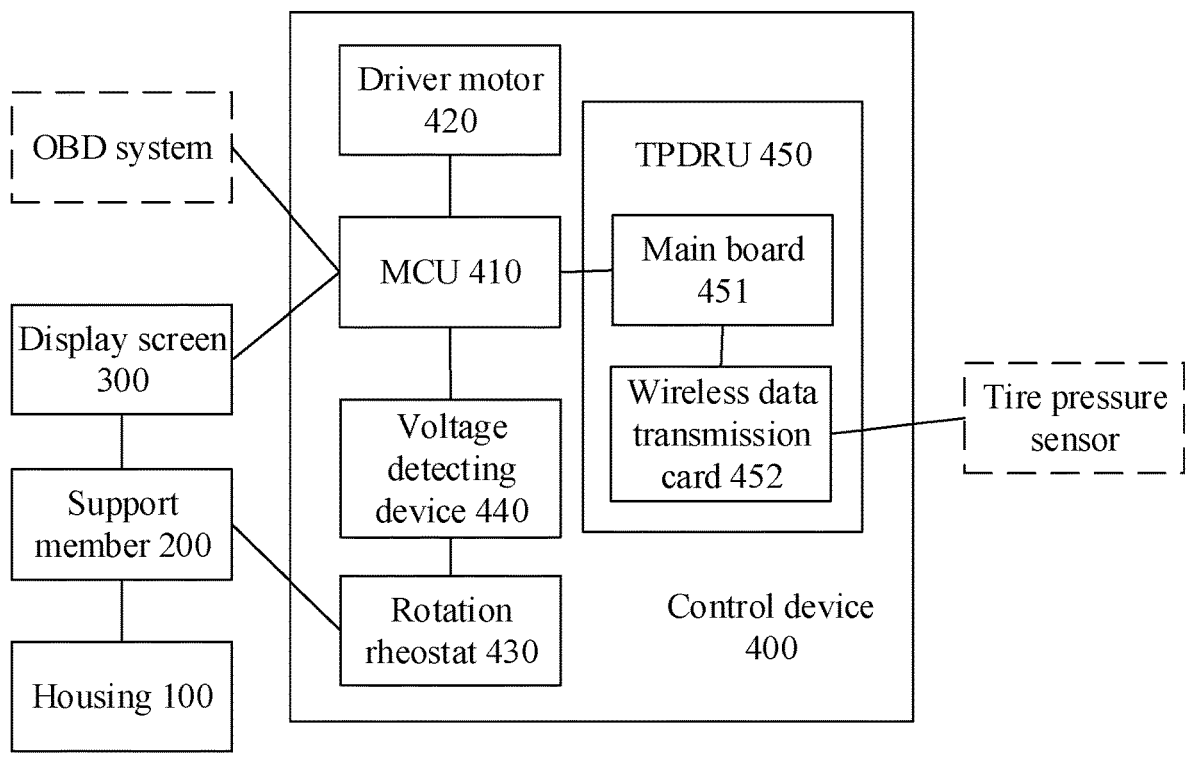
FIG. 1 is a block diagram of an on-board HUD according to an embodiment.
Figure 2:
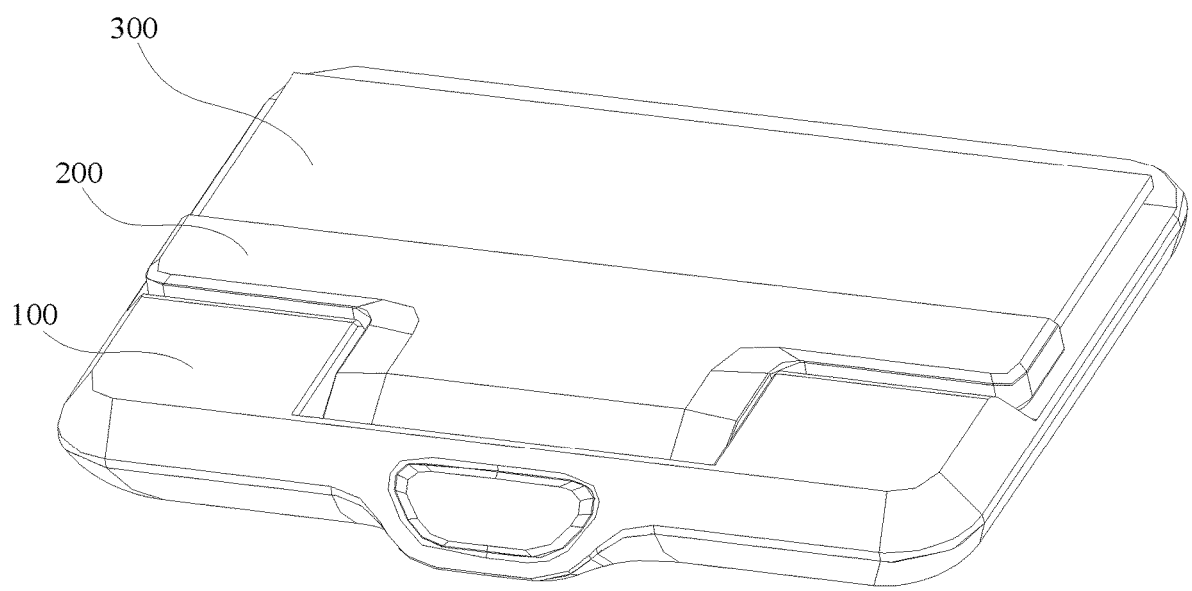
FIG. 2 is a perspective view of the on-board HUD of FIG. 1 in a closed state.

Embodiments of the disclosure are described more fully hereinafter with reference to the accompanying drawings. Various embodiments are presented in the drawings. The various embodiments of the disclosure may, however, be embodied in many different forms and should not be construed as limited to the embodiments set forth herein.

It should be understood that when an element is defined as "fixed to" another element, it is either directly on an element or indirectly on an element with an mediating element. When an element is considered being "connected" to another element, it is either directly connected to an element or indirectly connected to an element with an mediating element. The terms used in the disclosure such as "up right", "horizontal", "upper", "lower", "left", "right" and other language are intended for descriptive purpose only, as opposed to suggesting the only embodiment.

Unless otherwise defined, all terms used herein have the same meaning as commonly understood by one of ordinary skill in the art to which this disclosure belongs. The terms used in the specification of the present disclosure is for the purpose of describing the embodiments of the present disclosure, as opposed to limiting thereto. The language "and/or" used in the disclosure refers to any and all combinations of the one or multiple items listed.

Referring to FIGS. 1 to 4, an on-board HUD 10 according to an embodiment is configured to be placed in front of a driver and to display the traveling information, so as to allow the driver to be informed of the traveling situation of the vehicle without lowering head and checking the dash board.

Figure 3:
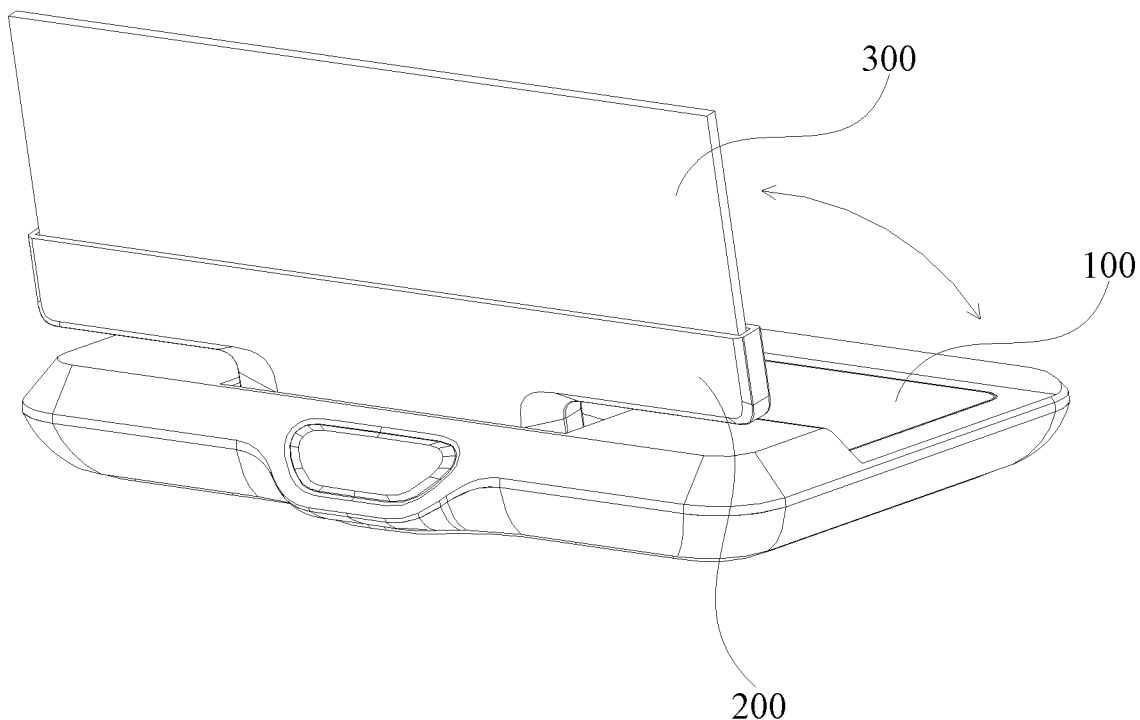
FIG. 3 is a perspective view of the on-board HUD of FIG. 1 in an open state.

The on-board HUD 10 includes a housing 100, a support member 200, a display screen 300 and a control device 400. The support member 200 is connected to the housing 100, a side of the display screen 300 is fixed to the support member 200, the housing 100 and the display screen 300 are respectively disposed on the two opposite sides of the support member 200. The control device 400 is located inside the housing 100 and is connected to the on-board diagnostic (OBD) system to obtain traveling information from the OBD system. The control device 400 is connected to the display screen 300 which displays the traveling information obtained by the control device 400 from the OBD system. The control device 400 is connected to the support member 200 to drive the same to rotate with respect to the housing 100. When the control device 400 is disconnected from the OBD system, the display screen 300 is firmly attached to an upper surface of the housing 100 to demonstrate the closed status shown in FIG. 2, no traveling information is displayed on the screen 300 right now. When the control device 400 is connected to the OBD system, the control device 400 drives the support member 200 and the display screen 300 to rotate, such that an intersection angle is introduced between the display screen 300 and the upper surface of the housing 100 and an open status shown in FIG. 3 is demonstrated. The display screen 300 demonstrates a flat shape to display, in a flat panel, a plurality of traveling information. Also, the display screen 300 is transparent, such that the display screen 300 can be saw through besides the connecting point with the support member 200, therefore the driver can observe the traveling environment through the display screen 300 while checking the traveling information displayed on the display screen 300. As such, the traveling view of the driver will not be blocked, the travel safety is increased and the user experience is also improved. In particular, the display screen 300 is a transparent organic light-emitting display screen, which is slim and light and can reduce the blocking to the user view to a relatively large extent.

It should be noted that in the present embodiment, the OBD system has an output interface, the control device 400 is connected to the output interface through a data transmission cable, i.e., the foregoing on-board HUD 10 is in wired connection with the OBD system. In other embodiments, the control device 400 can be connected to the OBD system by way of a wireless signal transmission.

Figure 4:
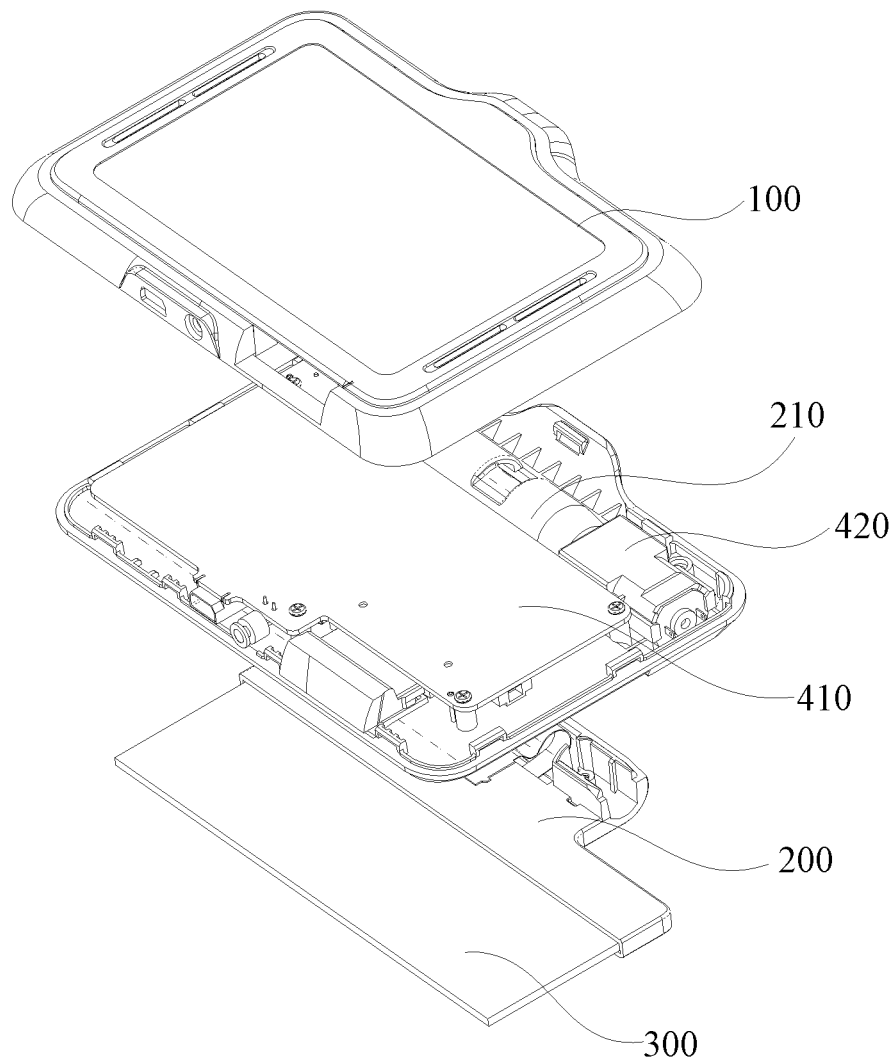
FIG. 4 is a perspective, exploded view of the on-board HUD in FIG. 3.

As shown in FIG. 4, a pivot 210 is formed on the support member 200, the pivot 210 is rotatably connected to the housing 100, the support member 200 and the display screen 300 can rotate an axis of the pivot 210 with respect to the housing 100, thereby enabling the opening and the closing of the on-board HUD 10. In particular, the control device 400 includes a main control unit (MCU) 410 and a driver motor 420 connected to the MCU 410. The output shaft of the driver motor 420 is connected to the support member 200, the output shaft of the driver motor 420 can rotate at a relatively low velocity and drive the support member 200 and the display screen 300 to rotate with the axis of the pivot 210 as the rotation shaft 210.

When the control device 400 is connected to the OBD system, i.e., the MCU 410 is connected to the OBD system, the MCU 410 controls the driver motor 420 to operate to cause the display screen 300 to rotate, and a largest open status that the intersection angle with the upper surface of the housing 100 is largest is achieved. When the control device 400 is disconnected to the OBD system, i.e., the MCU 410 is disconnected to the OBD system, the MCU 410 controls the driver motor 420 to operate to cause the display screen 300 to rotate reversely, and a closed status that the upper surface of the housing 100 closely touched is achieved. It should be noted that, after the display screen 300 is in a largest open status, any target position of the display screen 300 between the largest open status and the closed status can be obtained by manually rotating the display screen 300.

The control device 400 further includes a rotation rheostat 430 and a voltage detecting device 440 connected to the rotation rheostat 430. The rotation rheostat 430 is connected to the pivot 210 and rotates along with the pivot 210, in the process of rotation, the resistance of the rotation rheostat changes. The voltage detecting device 440 is connected to the rotation rheostat 430 to detect the voltage applied to both ends of the rotation rheostat 430, and the detection result is stored in the MCU 410. When the display screen 300 is in a closed status, the voltage detecting device 440 detects and obtains a first voltage applied to both ends of the rotation rheostat 430. When the display screen 300 is in a largest open status, the voltage detecting device 440 detects and obtains a second voltage applied to both ends of the rheostat 430. When the display screen 300 is manually rotated to a target position, the voltage detecting device 440 detects and obtains a third voltage applied to both ends of the rheostat 430. The third voltage is between the first voltage and the second voltage. In using the foregoing on-board HUD 10, the display screen 300 firstly will move from the closed status to the largest open status, then after the driver manually rotates the display screen 300 to the next target position, the MCU 410 stores the third voltage corresponding to the target position, when next time the on-board HUD 10 is used, the driver motor 420 drives the display screen 300 to rotate slowly, when the voltage detecting device 440 detected that the voltage applied to both ends of the rotation rheostat 430 is equal to the third voltage, the driver motor 420 stops rotation, causing the display screen 300 to stop at the target position. As such, the foregoing on-board HUD 10 has a function to use status memory to memorize the usage habits of a user, thereby making the displaying screen 300 to be directly rotated to the last used position of the user when the foregoing on-board HUD 10 is again used, which saves the user from the trouble that a manual adjustment is required for each time of using, and improves the user experience.

In an embodiment, the control device 400 further includes a tire pressure detecting and receiving unit (TPDRU) 450 which is connected to the MCU 410. It should be noted that a tire pressure sensor is mounted on the tire to detect related parameters of the tire pressure of the tire. The tire detecting and receiving device 450 includes a main board 451 and a wireless data transmission card 452 integrated on the main board 451, the wireless data transmission card 452 is in wireless connection with the tire pressure sensor to receive the detection result of the tire pressure sensor. In the meanwhile, the wireless data transmission card 452 transmits the received parameters to the main board 451 which integrates and processes the related parameters to eventually obtain the tire pressure information of the tire. The main board 451 and the display screen 300 are both connected to the MCU 410, the main board 451 transmits the tire pressure information to the MCU 410, after the processing of the MCU 410, the tire pressure information is displayed on the display screen 300.

In one embodiment, the tire pressure detecting and receiving unit (TPDRU) 450 is removably connected to the MCU 410, a receiving slot (not shown) configured for removing or inserting the tire pressure detecting and receiving device 450 is formed on the housing 100, such that the user can choose whether to mount the tire pressure detecting and receiving device 450 according to his/her own needs, thereby improving the user experience.

Figure 5:
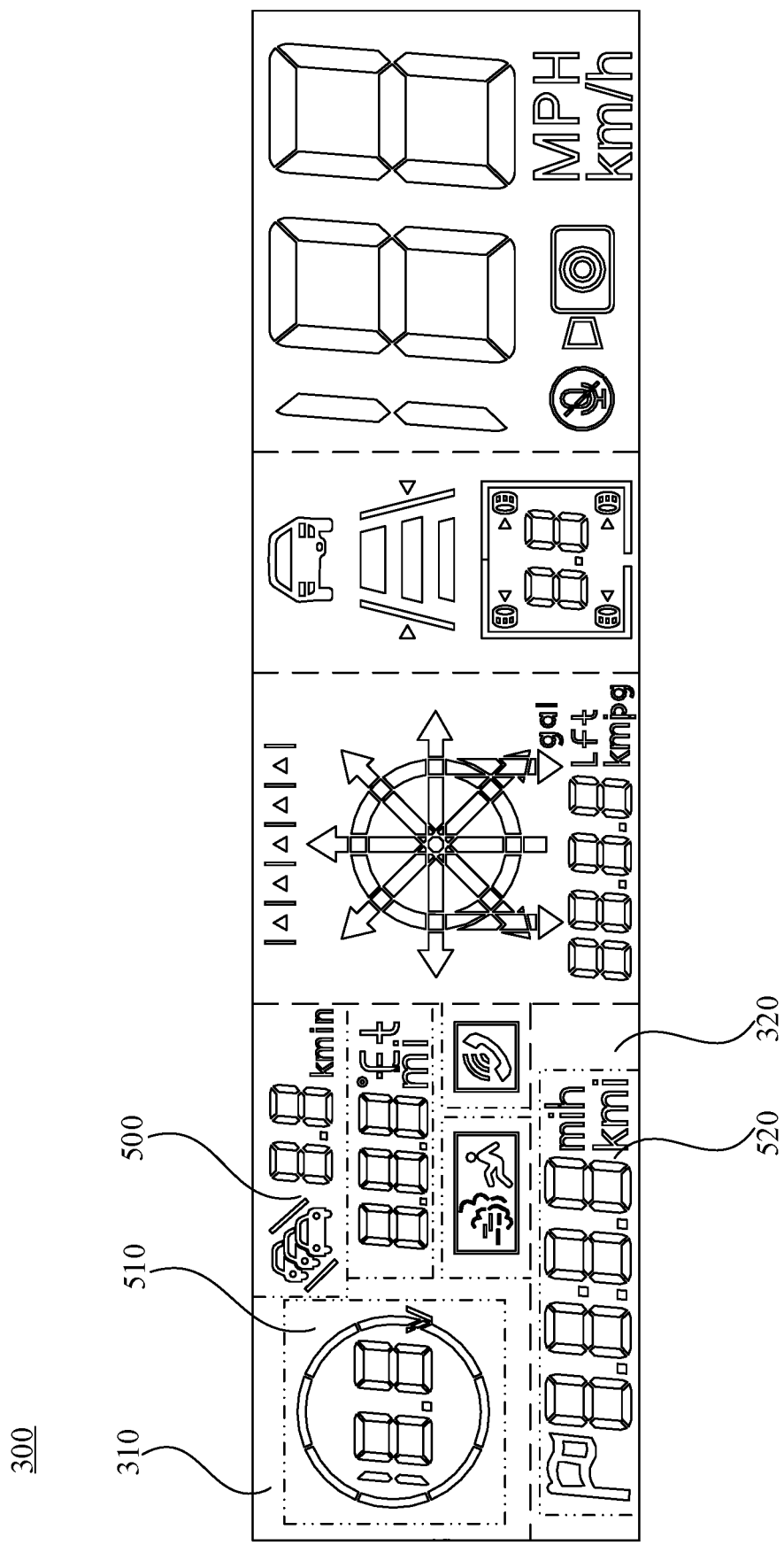
FIG. 5 is schematic diagram of traveling information on a display screen in the on-board HUD in FIG. 4.

As shown in FIG. 5, the traveling information of the user are tire pressure information, speed limit information, voltage information, and other information of destination distance, water temperature and so on. The plurality of pieces of traveling information can be displayed on the display screen 300 in the form of a plurality of information blocks. For some information blocks 500, each information block 500 separately corresponds one piece of travel information, while for other information blocks 500, each information block 500 corresponds a combination of a plurality of travel information, such that a plurality of information blocks 500 can correspond a number of pieces information larger than the number of information blocks. Such that more traveling information can be displayed in the limited display area on the display screen 300 to provide the user with relatively comprehensive traveling information.

Furthermore, the display screen 300 is divided into a plurality of display regions, at least one information block 500 is displayed in one display region, the displaying colors in two adjacent display regions are different, such that a relatively great display chroma is demonstrated between two adjacent display regions to facilitate the user to swiftly find the target information block 500, thereby obtaining the desired traveling information in a timely fashion. Meanwhile, demonstrating the relatively great display chroma between two adjacent display regions 310 is also helpful for the driver to swiftly locate the information block 500 that is abnormal when a warning is alarmed due to abnormal situation of one piece of travel information. For example, there are five information blocks 500 in the display region 310, and one information block 500 in the display region 320. The one information block 510 in the display region 310 displays a single voltage information, the information block 520 in the display region 320 performs a combined display of the destination distance information and the time information.

The different technical features of the above embodiments can have various combinations which are not described for the purpose of brevity. Nevertheless, to the extent the combining of the different technical features do not conflict with each other, all such combinations may be regarded as being within the scope of the disclosure.

What is claimed is:

1. An on-board head up display (HUD), comprising:
   a housing;
   a support member rotatably connected to the housing;
   a display screen being transparent and flat, wherein a side of the display screen is fixed to the support member, such that the display screen is rotatable relative to the housing into any of a range of orientations between an open status and a closed status, the open status corresponding to a front surface of the display screen having a largest intersection angle with an upper surface of the housing, and the closed status corresponding to the front surface of the display screen being in contact with the upper surface of the housing; and
   a control device located in the housing and connected to the display screen, and configured to communicatively connect with an on-board automatic diagnostic system, such that:
   responsive to the control device not being communicatively connected to the on-board automatic diagnostic system, the control device is configured to automatically drive the support member to rotate the display screen with respect to the housing to the closed status; and
   responsive to the control device being communicatively connected to the on-board automatic diagnostic system, the control device is configured to display the traveling information on the display screen and automatically drive the support member to rotate the display screen with respect to the housing to one of the range of orientations other than the closed status.

2. The on-board HUD of claim 1, wherein the display screen is a transparent organic light-emitting display (TOLED) screen.

3. The on-board HUD of claim 1, further comprising a pivot formed on the support member, wherein the pivot is rotatably connected to the housing, and the support member and the display screen are capable of rotating with respect to the housing about an axis of the pivot.

4. The on-board HUD of claim 1, wherein the control device comprises a main control unit (MCU) and a driver motor connected to the MCU, and the driver motor is connected to the support member to drive the support member to rotate.

5. The on-board HUD of claim 1 wherein: the control device further comprises a rotation rheostat and a voltage detecting device connected to the rotation rheostat; the rotation rheostat is connected to, and rotates along with, a pivot formed on the support member and rotatably connected to the housing; and the voltage detecting device detects a voltage applied to both ends of the rotation rheostat and stores a detection result.

6. The on-board HUD of claim 5, wherein:
   a first value of the voltage detected by the voltage detecting device corresponds to the closed status;
   a second value of the voltage detected by the voltage detecting device corresponds to the open status.

7. The on-board HUD of claim 6, wherein:
   responsive to the control device not being communicatively connected to the on-board automatic diagnostic system at a first time, the voltage detecting device is further configured to store a third value of the voltage as the detection result, the third value of the voltage being between the first value and the second value and corresponding to a target position achieved by manual rotation of the display screen to one of the range of orientations prior to the control device automatically driving the support member to rotate the display screen with respect to the housing to the closed status; and
   responsive to the control device being communicatively connected to the on-board automatic diagnostic system at a second time subsequent to the first time, the control device is configured to automatically rotate the display screen to the target position in accordance with the stored detection result.

8. The on-board HUD of claim 7, wherein the control device is configured to drive rotation of the display screen so as to stop rotation when the voltage detecting device detects that a voltage applied to both ends of the rotation rheostat is equal to the third value.

9. The on-board HUD of claim 1, wherein the control device comprises a MCU and a tire pressure detecting and receiving unit (TPDRU), the TPDRU comprises a main board and a wireless data transmission card integrated on the main board, the wireless data transmission card is in wireless connection with a tire pressure sensor mounted on a tire, and both of the main board and the display screen are connected to the MCU.

10. The on-board HUD of claim 9, wherein the tire pressure detecting and receiving device is removably connected to the MCU, the housing defines a receiving slot configured to receive the tire pressure detecting and receiving device.

11. The on-board HUD of claim 1, wherein the control device is in wireless connection with the on-board automatic diagnostic system.

12. The on-board HUD of claim 1, wherein the on-board automatic diagnostic system has an output interface, the control device is connected to the output interface through a data transmission cable.

13. The on-board HUD of claim 1, wherein: there are a plurality of pieces of the traveling information; and the control device is configured to display the traveling information on the display screen in a form of a plurality of information blocks, wherein each information block corresponds to one of the plurality of pieces of the traveling information.

14. The on-board HUD of claim 13 wherein the display screen is divided into a plurality of display regions, each display region for display of at least one of the information blocks, and displaying colors of two adjacent display regions are different.

15. The on-board HUD of claim 1, wherein: there are a plurality of pieces of the traveling information; and the control device is configured to display the traveling information on the display screen in a form of a plurality of information blocks, wherein each information block corresponds to a combination of the plurality of pieces of the traveling information.

16. The on-board HUD of claim 15, wherein the display screen is divided into a plurality of display regions, each display region for display of at least one of the information blocks, and displaying colors of two adjacent display regions are different.

17. The on-board HUD of claim 1, wherein, responsive to the control device being communicatively connected to the on-board automatic diagnostic system, the control device is automatically to rotate the display screen to the open status.

18. The on-board HUD of claim 1, wherein:
responsive to the control device not being communicatively connected to the on-board automatic diagnostic system at a first time, the control device is further configured to record a target positionachieved by manual rotation of the display screen to one of the range of orientations prior to the control device automatically driving the support member to rotate the display screen with respect to the housing to the closed status; and
responsive to the control device being communicatively connected to the on-board automatic diagnostic system at a second time subsequent to the first time, the control device is configured to automatically rotate the display screen to the target position.

* * * * *